(12) United States Patent
Anderson

(10) Patent No.: US 6,375,039 B1
(45) Date of Patent: Apr. 23, 2002

(54) MATERIAL TRANSFER DEVICE

(75) Inventor: Jeffrey Todd Anderson, Randlett, OK (US)

(73) Assignee: Howmet Research Corporation, Whitehall, MI (US)

(*) Notice: Subject to any disclaimer, the term of this patent is extended or adjusted under 35 U.S.C. 154(b) by 0 days.

(21) Appl. No.: 09/661,423

(22) Filed: Sep. 13, 2000

(51) Int. Cl.[7] .............................................. B65G 53/14
(52) U.S. Cl. .......................................... 222/82; 222/196
(58) Field of Search .......................... 222/82, 196, 637; 51/436

(56) References Cited

U.S. PATENT DOCUMENTS

| | | | |
|---|---|---|---|
| 2,528,319 A | 10/1950 | Peterson | 74/87 |
| 3,266,327 A | 8/1966 | Felixon | 74/87 |
| 3,448,964 A | 6/1969 | Wickes | 259/72 |
| 3,563,421 A | 2/1971 | Coates | 222/196 |
| 3,643,925 A | 2/1972 | Uebel | 259/1 R |
| 1,971,123 A * | 2/1975 | Tappen | 222/83 |
| 3,863,808 A * | 2/1975 | Vertue | 222/82 |
| 4,569,161 A * | 2/1986 | Shipman | 51/436 |
| 5,603,566 A | 2/1997 | O'Ryan et al. | 366/107 |
| 5,846,077 A | 12/1998 | Sertich | 433/120 |

* cited by examiner

Primary Examiner—Philippe Derakshani
Assistant Examiner—Thach H Bui

(57) ABSTRACT

A particulate material transfer device comprises a tubular body having a passage with an entrance to receive particulate material and an exit for discharging material and an annular chamber about the body in which a travelling member is disposed for movement about the body in a manner to impart vibrations thereto. A fluid inlet supplies pressurized air to the chamber to cause the travelling member to move about the body to impart vibrations thereto. A plurality of fluid discharge openings extend from the chamber to the passage to discharge pressurized fluid toward the exit to transfer material from the entrance through the passage toward the exit.

12 Claims, 3 Drawing Sheets

MATERIAL TRANSFER DEVICE

FIELD OF THE INVENTION

The present invention relates to a material transfer device and, more particular, to an air amplifying material transfer device and method.

BACKGROUND OF THE INVENTION

Air amplifiers are commonly used to create a suction which is capable of lifting pelletized or small particle size material and transferring the material to another location using the amplifiers high volume air output. Air amplifier devices are effective to transfer material so long as the material freely flows to the entrance of the device. If the material is sticky or has a tendency to settle and pack tightly, the material may not move to the entrance of the air amplifier device such that stoppage of material flow to the device occurs due to starvation of material supply.

A known solution to the problem of material starvation to the air amplifier device is to vibrate the material or container thereof such as, for example, by manually shaking the container or stirring the material or by vibrating a parts delivery tube by a vibratory mechanism that uses compressed air to move a ball mass thereabout to generate vibratory motion as described in U.S. Pat. No. 3,563,421.

SUMMARY OF THE INVENTION

The present invention provides in one embodiment a particulate material transfer device comprising a tubular body having a material transfer passage with an entrance to receive particulate material and an exit for discharging material and an annular chamber about the body in which a travelling member is disposed for movement about the body in a manner to impart vibrations thereto. A fluid inlet supplies pressurized air or other pressurized gaseous fluid to the chamber to cause the travelling member to move about the body to impart vibration thereto. One or more fluid discharge passages extend from the chamber to the material transfer passage to discharge pressurized air (or other gaseous fluid) toward the exit to transfer material from the entrance to the exit. The pressurized fluid used to move the travelling member thus is used also to generate suction in the tubular body to transport material through the passage thereof.

A method embodiment of the invention involves communicating an entrance of a material transfer passage of an air amplifier tubular body to a source of material to be transferred, moving a travelling member about the tubular body using a pressurized fluid in a manner that movement of the travelling member vibrates the body, and discharging the pressurized fluid into the passage in a direction toward an exit thereof to transfer the material from the entrance to the exit.

The above and other objects and advantages of the present invention will become more readily apparent from the following drawings taken in conjunction with the following detailed description.

DESCRIPTION OF THE INVENTION

Figure 1:
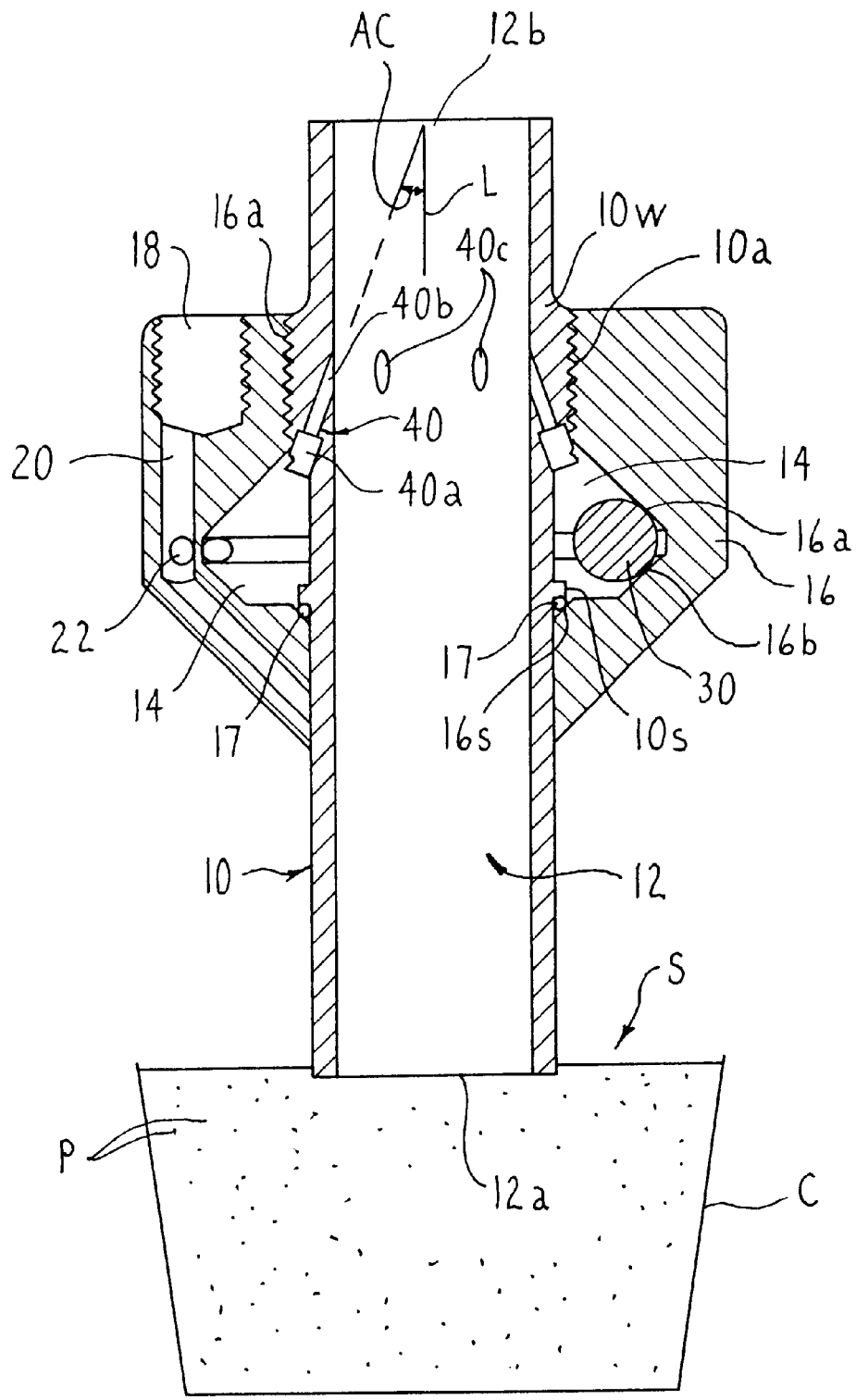
FIG. 1 is a sectional view of an air amplifier material transfer device in accordance with one embodiment of the invention.
Figure 2:
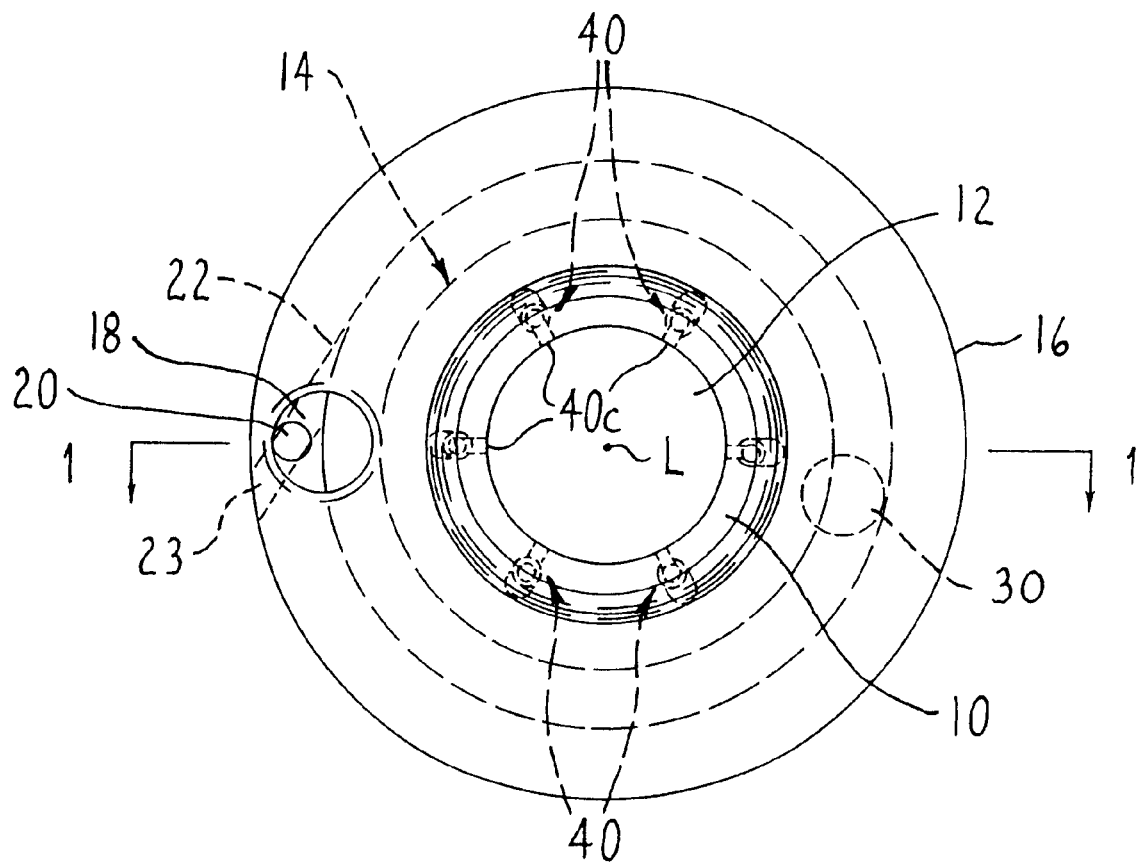
FIG. 2 is a plan view of the device of FIG. 1.

Referring to FIGS. 1 and 2, an air amplifier material transfer device in accordance with an illustrative embodiment of the present invention is shown. The material transfer device comprises a tubular body 10 having an elongated material transfer passage 12 with an entrance opening 12a to receive particulate material P and an exit opening 12b for discharging the particulate material P. The particulate material P typically comprises particles of the material held in a source container C for supply to the entrance 12a. Various particulate materials can be transferred using the material transfer device of the invention. Such particulate materials include, but are not limited to, pelletized injection materials such as pelletized wax particles, small media stone, and other particles.

For purposes of illustration only and not limitation, the tubular body 10 typically comprises an aluminum (or other metallic or plastic) cylindrical tube having a tube diameter and length that can be selected as desired for a particular material transfer application. An illustrative tube inner diameter can be 1.0 inches. The tubular body 10 is not limited to cylindrical cross-section tubular shapes as any other tubular cross-sectional shapes can be used. For example, a tubular body 10 with a polygonal, oval or other cross-sectional shape can be used in practice of the invention.

An annular chamber 14 is disposed about the circumference (periphery) of the body 10 coaxial with longitudinal axis of the passage 12. The chamber 14 is formed between tubular body 10 and a tubular member 16 having internal threaded section 16a that threads on externally threaded section load of the tubular body 10. The tubular member 16 can be comprised of a hardened steel body or hardened steel inserts that form the chamber 14. The tubular member 16 includes a threaded inlet port 18 to receive a threaded fitting (not shown) of a compressed air conduit (not shown). The inlet port 18 communicates to an axially extending passage 20 and then passage 22 that extends into the chamber 14 in a direction tangent thereto, FIG. 2, so that compressed air is discharged into chamber 14 for swirling circumferentially therein about the periphery of the tubular body 10. The passage 22 is drilled into member 16, and the outer end portion 23 of passage 22 is sealed or plugged with weld filler material. For purposes of illustration only, the compressed air typically is provided at a gage pressure in the range of 40 to 80 psi. The invention is not limited to use of compressed air and can be practiced with other pressurized gaseous fluids, such as inert gases, nitrogen and any other suitable pressurized gas.

The tubular body 10 includes a circumferential, radially extending shoulder 10s spaced from an annular chamfered shoulder 16s of the tubular member 16 to confine an o-ring seal 17 therebetween to prevent escape of compressed air from chamber 14, except through gas discharge passages 40 as described below.

A travelling steel ball member 30 is disposed in chamber 14 for movement by the swirling compressed air flow in chamber 14 circumferentially about the circumference (periphery) of the body 10 to impart vibration thereto. The ball member 30 rides on converging walls 16a, 16b of the tubular member 16, FIG. 1. The rotation of the ball member 30 results in vibration of the body 10. The mass of the ball member 30 is selected to achieve a desired vibration of the tubular body 10. For purposes of illustration only, a ball mass of 6 grams can be used to practice the invention. The vibration of the tubular body 10 is used to agitate the material to be transferred to facilitate suction of the material P into the passage 12 as described below.

A plurality of fluid nozzle discharge passages 40 are provided and extend from chamber 14 to passage 12. In particular, a plurality (e.g. 6) of compressed air nozzle discharge openings 40 extend through a wall 10w of the tubular body 10 and are spaced about the circumference (periphery) of the tubular body 10, FIG. 2. The passages 40 extend through the wall 10w where the threaded section 10a is provided.

The centerline of each passage 40 is oriented at an inclined acute angle AC (e.g. 20 degrees) relative to the longitudinal axis L of the passage 12. Each passage 40 includes a large diameter (e.g. 0.14 inch diameter) cylindrical entry passage 40a that communicates to chamber 14 and a small diameter (e.g. 0.07 inch diameter) cylindrical discharge passage 40b that communicates to the passage 12 to provide oval discharge openings 40c. The compressed air is directed upwardly toward the axis L of the passage 12 to create a suction at the entrance opening 12a and a high volume air blower at the exit opening 12b effective to transfer material from the entrance opening to the exit opening for discharge there.

In a method embodiment of the invention, the entrance opening 12a of the tubular body 10 is placed in communication to a source S of a material to be transferred. For example, referring to the Figure, the entrance opening 10a is placed onto a bed of particulate material P confined in container C. Compressed air is introduced to chamber 14 via inlet port 18 to cause ball member 30 to move circumferentially in chamber 14 about the tubular body 10 body so that movement of the travelling ball member 30 vibrates the body 10. The compressed air is discharged from chamber 14 through passages 40 into the passage 12 in a direction toward exit opening 12b to generate a suction at the entrance opening 12a and high volume blower action at the exit opening 12b to lift the particulate material P from the source and transfer it from the entrance opening 12a to the exit opening 12b where the particulate material is discharged to a conventional transfer tube (not shown) leading to the desired new location of the material. Vibration of the tubular body 10 and thus its entrance opening 10a placed in the particulate material P agitates the particulate material P in the vicinity of the entrance opening 12a to facilitate suction of the particulate material P from the container through the entrance opening 12a to the exit opening 12b for discharge.

Figure 3:
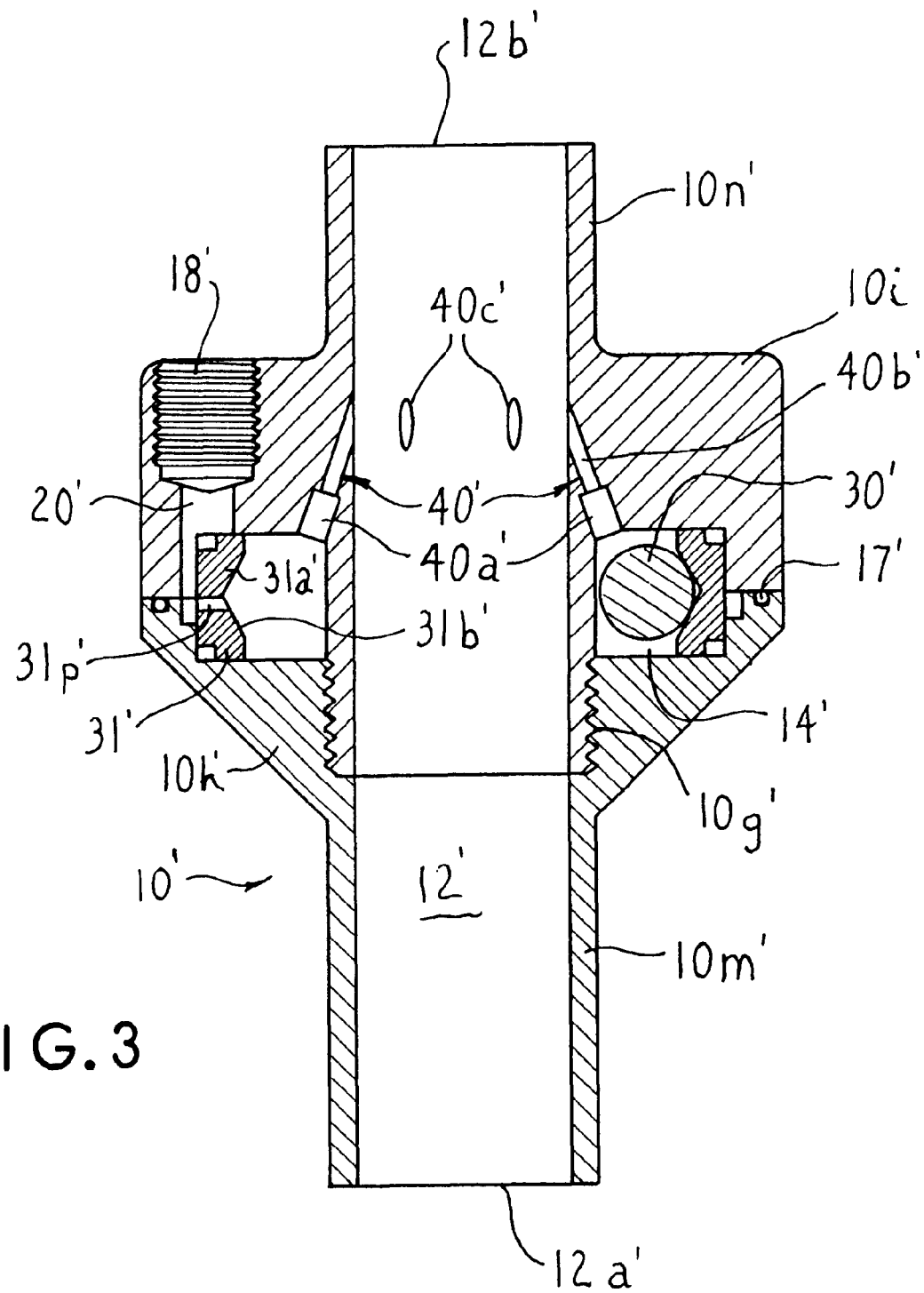
FIG. 3 is a sectional view of an air amplifier material transfer device in accordance with another embodiment of the invention.

FIG. 3 illustrates another embodiment of the invention where like reference numerals primed are used to designate like features of FIGS. 1–2. In FIG. 3, tubular body 10' comprises two pieces 10m', 10n' threaded together at threaded regions 10g' thereon. Tubular body pieces 10m', 10n', include circumferentially enlarged regions 10h', 10i' that define a chamber 14' therebetween when the pieces are threaded together as shown. An o-ring seal 17' is provided between regions 10h', 10i' to seal chamber 14'. A hardened annular bearing race 31' and travelling ball member 30' are disposed in chamber 14' so that the travelling ball member rides on converging walls 31a', 31b' of race 31'. The bearing race can be a commercially available hardened steel bearing race disposed in chamber 14' and is press fit in the chamber 14'. The bearing race 31' includes a radial passage 31p' communicated to inlet port 18' and axially extending passage 20' to receive compressed shop air therefrom as in the above embodiment. The travelling steel ball member 30' is disposed in chamber 14' for movement by the swirling compressed air flow in chamber 14' circumferentially about the periphery of the body 10' to impart vibration thereto. The ball member 30' rides on converging walls 31a', 31b' of the race 31'. The rotation of the ball member 30' results in vibration of the body 10'. The mass of the ball member 30' is selected to achieve a desired vibration of the tubular body 10' as described above. The vibration of the tubular body 10' is used to agitate the material to be transferred to facilitate suction of the material into the passage 12' as described above.

A plurality of fluid nozzle discharge passages 40' are provided and extend from chamber 14' to passage 12'. In particular, a plurality (e.g. 6) of compressed air nozzle discharge openings 40' extend through enlarged region 10i' of the tubular body 10' and are spaced about the circumference (periphery) of the tubular body 10'. The passages 40' extend through the region 10i' above threaded regions 10g' and exit at discharge openings 40c' in passage 12'. The embodiment of FIG. 3 functions in a manner similar to the embodiment of FIGS. 1–2 to transfer particulate material from the entrance opening 12a' to the exit opening 12b' where the particulate material is discharged to a conventional transfer tube (not shown) leading to the desired new location of the material.

The invention is advantageous to transfer particulate material, especially sticky or easily packed particles from one location to another. For example, the invention can be used to transfer pelletized wax particulate material from a source container to a material melting device or a hopper on injection molding press.

Although the invention has been described in detail above with respect to certain embodiments, those skilled in the art will appreciate that modifications, changes and the like can be made therein without departing from the spirit and scope of the invention as set forth in the appended claims.

I claim:

1. Material transfer device, comprising a tubular body having a passage with an open entrance end through which a material to be transferred is drawn into said passage of said tubular body and an open exit end for discharging material from said passage of said tubular body, an annular chamber about said body in which a travelling member is disposed for movement about said body to impart vibration thereto, a fluid inlet for supplying pressurized fluid to said chamber to cause said travelling member to move about said body, and at least one fluid discharge opening extending from said chamber to said passage at an acute angle relative to a longitudinal axis of said passage in a direction toward said open exit end to discharge said fluid toward said open exit end.

2. The device of claim 1 wherein said annular chamber extends is disposed between said entrance and said exit.

3. The device of claim 1 wherein said fluid inlet communicates to said chamber to establish a flow of fluid about the periphery of said body so as to move said travelling member in the peripheral direction about said body.

4. The device of claim 1 wherein said travelling member is a ball.

5. The device of claim 4 wherein a plurality of said fluid discharge openings are spaced about the periphery of said body.

6. The device of claim 1 including an annular bearing race in the chamber on which said travelling ball member moves.

7. The device of claim 6 wherein the annular bearing race includes a passage communicated to said fluid inlet and to said chamber.

8. A method of transferring material, comprising communicating an open entrance end of a passage of an air amplifier tubular body to a source of a material to be transferred, moving a travelling member about said body using a pressurized fluid such that movement of said travelling member vibrates said body, and discharging said fluid to said passage at an acute angle relative to a longitudinal axis of said passage in a direction toward an open exit end of said passage to transfer said material from said entrance end toward said exit end.

9. The method of claim 8 wherein pressurized air is directed into a peripheral chamber about said body and in which said travelling member is disposed so that said member travels in a peripheral direction about said body.

10. The method of claim 9 wherein said travelling member is a ball moved in a peripheral chamber about said body.

11. The method of claim 8 wherein said fluid is discharged from a plurality of fluid discharge openings spaced about the periphery of said passage.

12. The device of claim 8 wherein said traveling member is moved on an annular bearing race disposed in said chamber.

* * * * *

UNITED STATES PATENT AND TRADEMARK OFFICE
CERTIFICATE OF CORRECTION

PATENT NO. : 6,375,039 B1  
DATED : April 23, 2002  
INVENTOR(S) : Jeffrey Todd Anderson It is certified that error appears in the above-identified patent and that said Letters Patent is hereby corrected as shown below:

Column 4,
Line 55, change "a plurality of" to -- more than one --.

Column 6,
Line 6, change "device" to -- method --.

Signed and Sealed this

Tenth Day of September, 2002

*Attest:*

*Attesting Officer*

JAMES E. ROGAN
*Director of the United States Patent and Trademark Office*